United States Patent
Ghio

(10) Patent No.: US 12,259,729 B2
(45) Date of Patent: Mar. 25, 2025

(54) VEHICLE TRAJECTORY MAINTENANCE DEVICE

(71) Applicant: Inspire S.r.l., Genoa (IT)

(72) Inventor: Marco Ghio, Genoa (IT)

(73) Assignee: INSPIRE S.R.L., Genoa (IT)

(*) Notice: Subject to any disclaimer, the term of this patent is extended or adjusted under 35 U.S.C. 154(b) by 226 days.

(21) Appl. No.: 17/917,201

(22) PCT Filed: Apr. 6, 2021

(86) PCT No.: PCT/IB2021/052831
§ 371 (c)(1),
(2) Date: Oct. 5, 2022

(87) PCT Pub. No.: WO2021/205329
PCT Pub. Date: Oct. 14, 2021

(65) Prior Publication Data
US 2023/0176582 A1    Jun. 8, 2023

(30) Foreign Application Priority Data

Apr. 6, 2020   (IT) .................. 102020000007240

(51) Int. Cl.
*G05D 1/00*   (2024.01)
(52) U.S. Cl.
CPC ................................. *G05D 1/0212* (2013.01)

(58) Field of Classification Search
CPC .................................................... G05D 1/0212
See application file for complete search history.

(56) References Cited

U.S. PATENT DOCUMENTS

| | | |
|---|---|---|
| 7,287,774 B2 | 10/2007 | Mullins |
| 2010/0243342 A1* | 9/2010 | Wu ........................ B62D 57/00 180/9.1 |
| 2012/0181765 A1 | 7/2012 | Hill |
| 2016/0318337 A1* | 11/2016 | Clerc ..................... B62D 61/06 |
| 2017/0210414 A1 | 7/2017 | Sato |
| 2018/0022197 A1* | 1/2018 | Bewley ............... B60K 7/0007 180/21 |
| 2018/0154513 A1* | 6/2018 | Kou ........................ G10L 15/22 |
| 2018/0288334 A1* | 10/2018 | Zhang .................... B60R 11/04 |
| 2019/0294174 A1* | 9/2019 | Iwamoto .............. G05D 1/0221 |
| 2019/0322292 A1* | 10/2019 | Staab ...................... B61B 13/04 |
| 2020/0166938 A1* | 5/2020 | Hafenrichter ........ G05D 1/0202 |
| 2021/0086683 A1* | 3/2021 | Georgeson ............... B60P 3/07 |

* cited by examiner

*Primary Examiner* — Ramon A. Mercado
*Assistant Examiner* — Mohamad O El Sayah
(74) *Attorney, Agent, or Firm* — Perilla Knox & Hildebrandt LLP; Kenneth A. Knox

(57) ABSTRACT

A device for maintaining the trajectory of a vehicle, which moves along a trajectory and has at least one contact point with the ground, includes an attachments system to the vehicle, and a sphere configured to rotate on the ground during the movement of the vehicle.

8 Claims, 3 Drawing Sheets

VEHICLE TRAJECTORY MAINTENANCE DEVICE

The present invention relates to a device for maintaining the trajectory of a vehicle which performs a movement along a trajectory and which has at least one point of contact with the ground.

The device further has means for fixing to said vehicle.

The present invention relates in particular to all vehicles which move in contact with the ground, for the transport of both passengers and goods, and which are free to move along different trajectories, i.e., on non-obligatory paths, such as paths defined by rails or the like.

In fact, the term vehicle is intended as any means which moves on the ground along a trajectory, both with its own propulsion, and dragged along such a trajectory.

Common vehicles known to the state of the art, such as two-, three-, four- or multi-wheel vehicles, drones, trailers, etc., fall within this term.

Regardless of the propulsion, constructional features and means of contact with the ground, such vehicles have a common problem, namely drifting, that effect which can be manifested when a vehicle travelling along a curved trajectory loses contact with the ground and drifts outwards of the curve travelled.

In fact, a vehicle travelling along a curved trajectory varies the amount of motion thereof. However, while vehicles are travelling, they tend to keep the vector of the amount of motion constant, so the frictional force which keeps the vehicle in the desired trajectory intervenes.

When the frictional force, in particular the tangential component of such force, no longer compensates for the change in the amount of motion, the vehicle drifts and no longer maintains the desired trajectory.

Currently, there is no solution to avoid such drifting phenomena, except the prudence of the drivers, who by varying the speed and setting of the trajectory, manage to keep the vehicle in trajectory.

There is therefore a need not satisfied by the devices and systems known to the state of the art to create a device which allows, automatically and without necessarily requiring human intervention, to avoid the drifting effect during travel, regardless of the vehicle speed or mass.

The present invention achieves the above objects by obtaining a device as described above, in which said device comprises a sphere configured to rotate on the ground during the movement of the vehicle to which the device is attached.

The presence of the sphere allows to have a further point of contact on the ground which increases the friction while the vehicle is travelling.

A device is thus obtained which has an element which generates an additional force, namely friction force, in the event of a change in the amount of motion of the vehicle.

Furthermore, the presence of the means for fixing to the device allows to adapt the device to any vehicle known to the state of the art, in order to make it safer and easier to control.

Starting from the general concept of increasing friction force, it is possible to predict that the sphere has different activation and operating conditions and that it participates in the movement of the vehicle only passively, increasing friction, or that it actively contributes to adjusting the vehicle speed.

For this reason, according to a first embodiment, the trajectory maintenance device comprises a control unit configured for activating the sphere.

In particular, the sphere passes from an approaching condition with the ground, in which it is in contact with the ground, to a distancing condition with the ground, in which it is spaced from the ground.

The control unit therefore oversees the positioning of the sphere, advantageously raises and lowers the sphere, in order to maintain a constant level of friction of the vehicle with the sphere raised, or increase the level of friction to avoid drifting with the sphere lowered.

It follows that in the moments in which the vehicle does not risk losing the desired trajectory, such as during a straight motion, the sphere is not in contact with the ground and does not contribute to increasing friction and, consequently, does not require greater energy expenditure for the movement or propulsion of the vehicle itself.

It is evident that, in accordance with such a configuration, the device object of the present invention comprises means for moving the sphere in the direction of the ground on which the vehicle moves.

The control unit can be obtained in any of the manners known to the state of the art and preferably comprises processor means for executing a logic program and sensors for detecting the variation of certain parameters indicating the risk of a possible drift.

For example, the control unit could provide sensor means for detecting a change in the amount of motion.

In the case of "suspicious" variations, i.e., indicating a possible drift, the control unit controls the sphere, so as to position it in the approaching condition with the ground.

The approaching condition can be active or passive, i.e., the sphere can simply provide an increase in friction, or it can help adjust the vehicle speed.

To achieve such an effect, the device object of the present invention comprises sphere rotation elements controlled by the control unit and configured to rotate said sphere.

The rotation elements can for example be electromagnetic elements which generate attraction/repulsion forces to modify the motion of the sphere.

Preferably these are mechanical elements, such as rollers in contact with the sphere, so that the rotation of such rollers drags the rotation of the sphere.

Thus, advantageously said rotation elements comprise at least two rollers having rotation axes perpendicular to each other.

The combination of the various adjustments of the rotations of the two rollers allows the sphere to move according to all the degrees of freedom thereof.

The rotation speed and direction of the two rollers are controlled by the control unit.

In view of the advantageous aspects of the trajectory maintenance device described above, the present invention also relates to a vehicle comprising movement means configured to make the vehicle perform a path along a trajectory.

The vehicle further comprises at least one point in contact with the ground.

In particular, the movement means are obtained according to one or more of the features related to the trajectory maintenance device described above.

Therefore, the invention is not limited to a device, but also to a vehicle to which the previously described trajectory maintenance device is fixed, to facilitate movement and avoid vehicle drifting, in a manner entirely similar to that described previously.

According to a possible embodiment, the vehicle consists of a drone, which has at least two feet in contact with the ground.

Drone movement is a particularly critical aspect, especially in applications where drones land on a logistics support platform, which allows operations to be carried out on the drones.

In fact, the drone lands at a point corresponding to the real point of interest, thus it must be able to be moved.

Centring bars belonging to the platform are currently included, which approach the drone, grab it by the feet like a sort of clamp and drag it towards the point of interest.

Such a configuration has several drawbacks.

First of all, the weight of the drone risks causing deformation and wear of the bars by repeated cycles of use.

The wear is further aggravated by the fact that the dragging of the drones occurs in the presence of high friction, both for the materials used for the drone feet and for the platform surface, and for the operating environments (consider for example the saline environment in the case of naval operations).

For this reason, the presence of a sphere, which interacts with the surface of the platform and allows the movement of the drone, has particularly advantageous aspects.

In order to improve the movement of the drone and provide more than one point of contact with the ground which does not increase friction, it is possible to include that the movement means comprise at least one bearing or one wheel for each foot.

Therefore, the movement means, in the case of a drone, allow to create an alternative movement system to the common centring bars.

In this case, it is evident that it is preferable to include that the sphere has the rotation elements described above, so that an active rotation of the sphere can be obtained, to generate the movement of the drone.

According to an alternative form, the vehicle of the present invention consists of a means of transport having wheels at the ground contact points.

As will be described in the following through the illustration of some embodiments, the transport means can for example be a normal four-wheel automobile, in which the sphere is positioned at the centre of the four wheels and provides a further point of contact of the vehicle with the ground.

The same applies to a two-wheeled vehicle, such as a motorcycle, in which it could be included to position the sphere at the centre of gravity of the motorcycle itself.

Such a solution has particularly important safety implications, as it would prevent motorcyclists from falling: as soon as the control unit detects a sudden change in the amount of motion, it actuates the sphere, so that the motorcycle has a further point of contact with the ground, avoiding slipping with the front wheel or the rear wheel, causing the motorcyclist to fall.

These and other features and advantages of the present invention will become clearer from the following description of some exemplary embodiments illustrated in the attached drawings in which.

It is specified that the figures attached to the present patent application show only two possible embodiments of the trajectory maintenance device and of the vehicle object of the present invention to better understand its advantages and features described.

Such embodiments are therefore to be understood for illustrative purposes only and not limited to the inventive concept of the present invention, namely, to obtain a trajectory maintenance device of vehicles capable of preventing drifting during the travel of a curved trajectory by part of the vehicle itself.

Figure 1A:
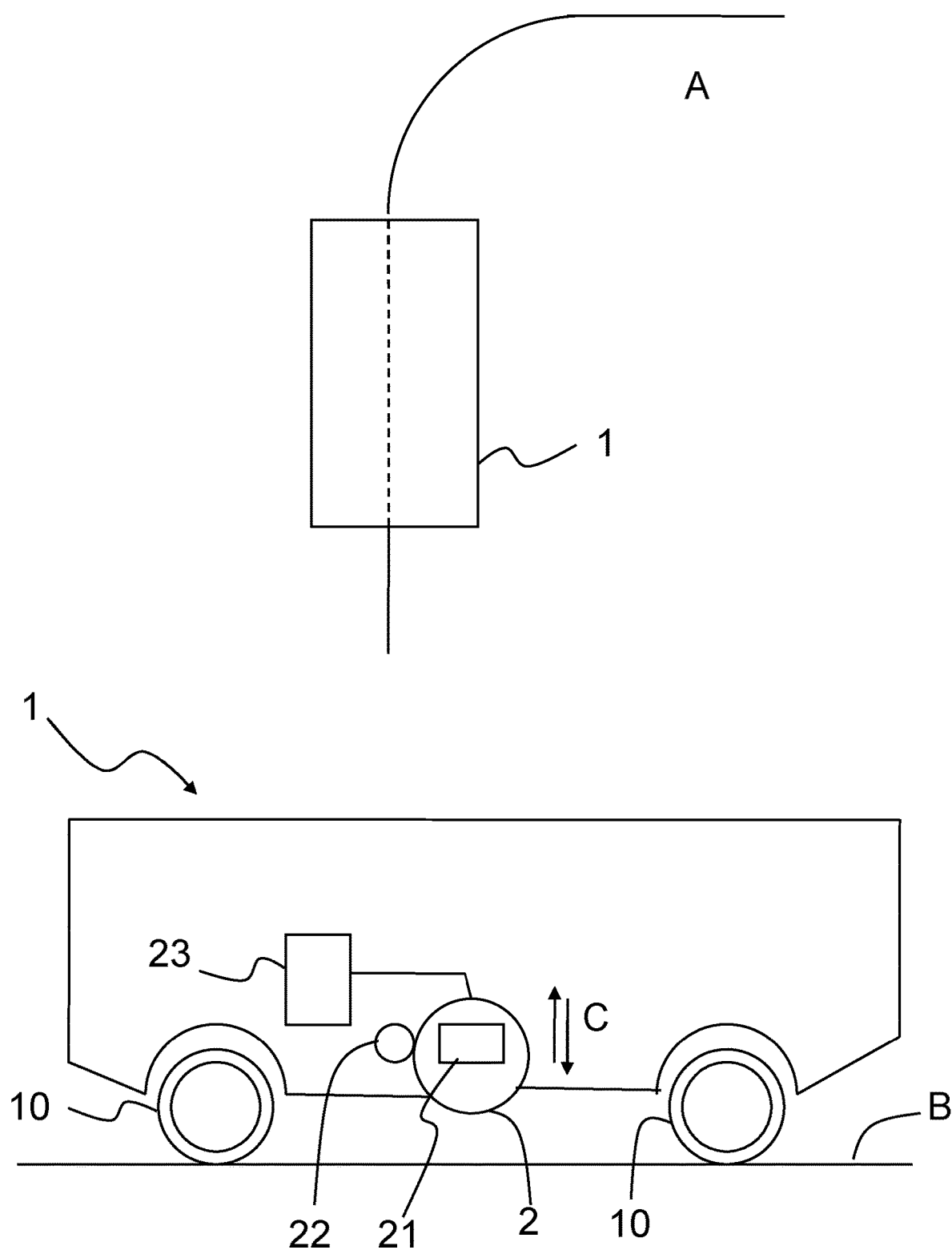
FIGS. 1a and 1b show, through a concept diagram, a possible embodiment of the device and the vehicle object of the present invention.
Figure 1B:
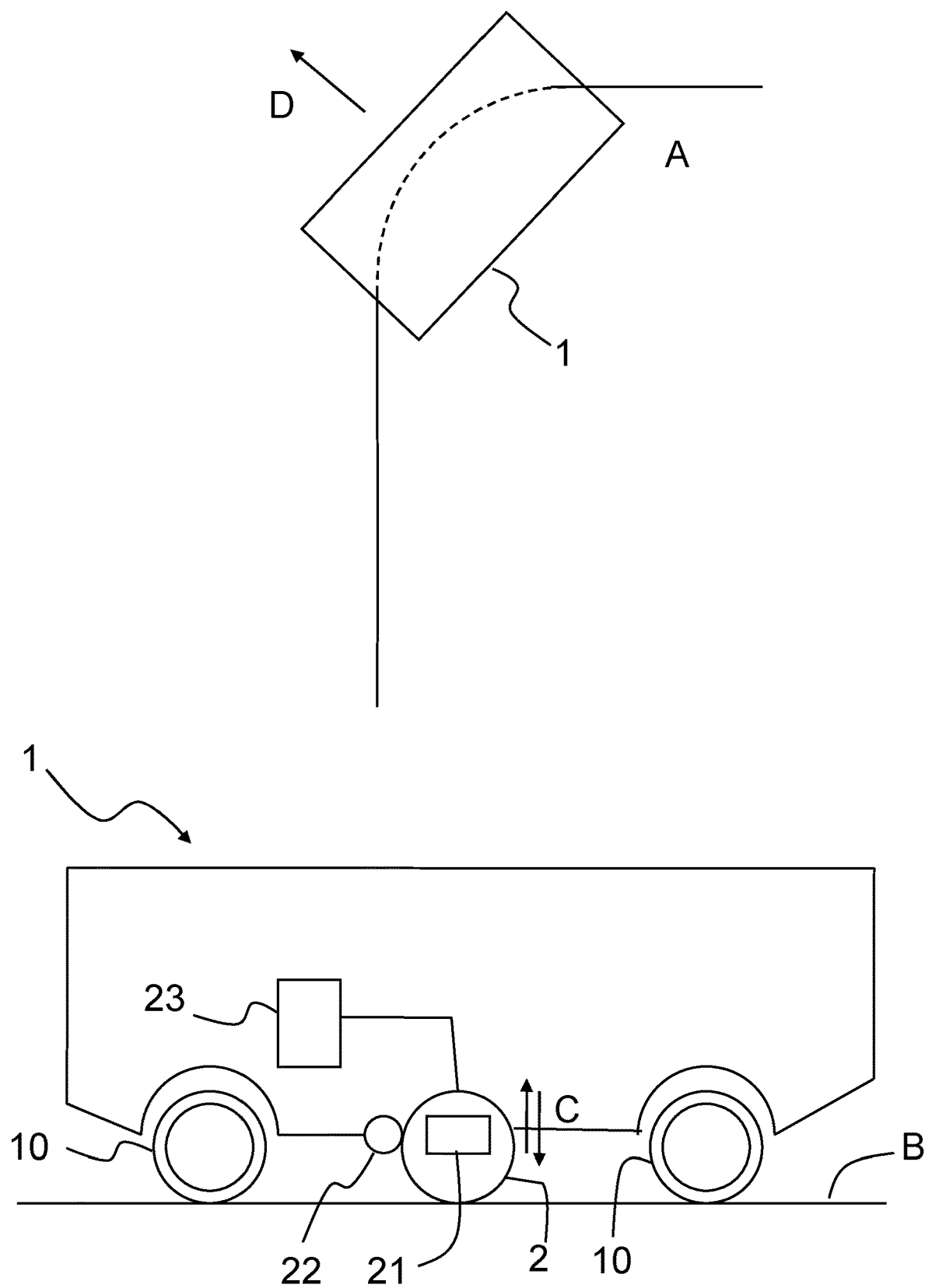

With particular reference to FIGS. 1a and 1b, the vehicle on which the device object of the present invention is mounted consists of an automobile 1, of which a side view according to a concept diagram is illustrated.

Like all automobiles known to the state of the art, the automobile 1 comprises four wheels 10 in contact with the ground B which, while driving the automobile, rotate according to a rotation axis perpendicular to the plane of the figures.

The automobile 1 travels a trajectory A along a first straight section, FIG. 1a, and a second curvilinear section, FIG. 1b.

Furthermore, the automobile 1, in addition to the wheels 10, has movement means which comprise a sphere 2 configured to rotate on the ground while the automobile is travelling.

As will be described in the following, unlike the wheels 10, the sphere 2 can rotate around different axes: in fact, the sphere 2 is housed inside the automobile 1, without any mechanical constraint.

For example, the sphere 2 can be housed inside a special housing seat obtained in the automobile 1, which allows the sphere 2 to remain in position.

For example, it is possible to include a bottom wall of the perforated housing seat, which allows the outer surface of the sphere 2 to be in contact with the ground.

The sphere housing seat of electronic devices known as a "mouse" can be an example of the housing seat which can be included inside the automobile 1.

Advantageously, in addition to the sphere 2, the movement means comprise a control unit 23 aimed at controlling the operation of the sphere 2.

In fact, the sphere 2 has movement means thereof, not shown in the figure, configured to be able to move the sphere 2 from an approaching condition to the ground B, FIG. 1b, to a distancing condition from the ground B, FIG. 1a, according to the direction indicated by the arrows C.

In addition, the sphere 2 has means of rotation thereof.

With particular reference to the figures, the rotation means consist of two rollers 21 and 22, which have the outer surface in contact with the outer surface of the sphere 2, so that the rotation of one or the other roller drags the sphere 2 by friction.

The roller 22 rotates around a rotation axis oriented perpendicular to the plane of the figure, while the roller 21 rotates around a rotation axis oriented parallel to the plane of the figures.

It follows that according to the variation in rotation speed of the two rollers 21 and 22, the sphere 2 can rotate in all directions, according to infinite rotation axes.

Both the movement means and the rotation means are controlled by the control unit 23, which can therefore position the sphere 2 in the approaching condition to the ground B and evaluate whether to let it passively rotate or actively rotate it through the actuation of the rollers 21 and 22.

The control unit 23 can control the rotation of one or both of the rollers 21 and 22 such that the rollers can rotate in the opposite direction with respect to the vehicle travel direction.

If the control unit 23 detects that it is not possible to make a correction to the vehicle trajectory, for example due to high speeds, instead of correcting the trajectory through a rotation in the travel direction, it can generate an "emergency braking", through the friction created by the sphere 2.

The sphere 2 can simply be placed in a ground approaching condition and block the rotation thereof, so as to create further friction.

Alternatively, it is possible to place the sphere 2 in the approaching condition to the ground B and activate the rollers 21 and 22 so as to rotate the sphere 2 in the opposite direction with respect to the travel direction.

To satisfy such a configuration, roller rotation adjusting means are advantageously provided.

Such means are controlled by the control unit 23 and are configured to block the rotation of the rollers 21, 22, and consequently that of the sphere 2, or to reverse the rotation direction of the rollers 21 and 22.

In FIG. 1a the automobile is located along a straight trajectory, so it does not need the intervention of the sphere 2 to maintain the trajectory.

The automobile 1 passes from the condition shown in FIG. 1a to the condition of FIG. 1b, in which it must perform a curvilinear trajectory.

As it travels along the curvilinear trajectory, the automobile 1 can drift and tend to move in the direction of arrow D, i.e., towards the outside of the curve.

During the course of the curve, the control unit 23 controls the sphere 2, so as to position it in an approaching condition to the ground B.

The control unit 23 comprises sensor means for determining the travel parameters of the automobile 1.

For example, the control unit 23 can detect a loss of friction by the wheels 10, or detect acceleration/deceleration of the automobile 1, amount of motion or for example deviations between the desired/planned trajectory and the actual trajectory (steering angle, automobile orientation, etc.).

Based on the parameters and the analysis thereof, the control unit 23 activates the rotation of the sphere 2 so as to allow the automobile 1 to travel the curve correctly, avoiding even minimal drifting.

As anticipated, the sphere 2 can participate actively, i.e., providing a rotation in a specific direction to avoid drifting, or passively, providing the automobile 1 with an extra contact point with the ground.

Regardless of the configuration, the control unit 23 can have means for adjusting the ground approaching condition, so that the sphere 2 is in contact with the ground B exerting different pressures, i.e., contributing differently to the increase in friction of the automobile 1.

Figure 2:
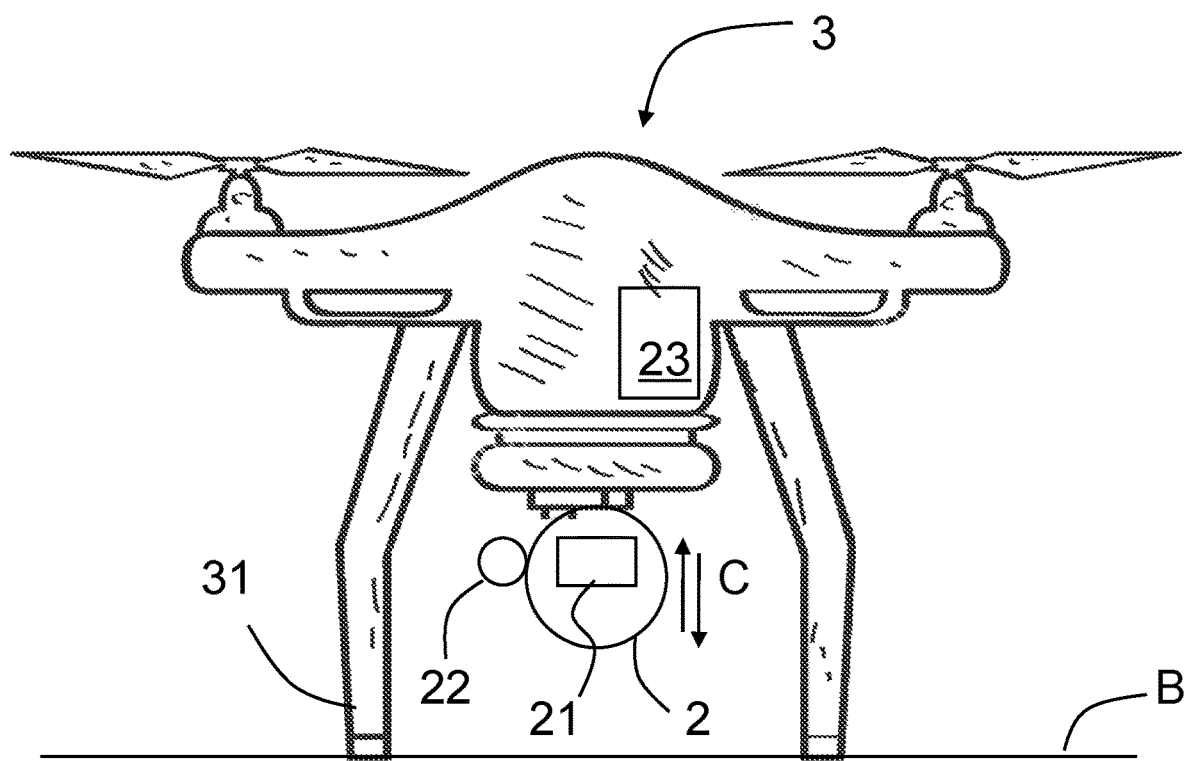
FIG. 2 illustrates, through a concept diagram, a further embodiment of the device and the vehicle object of the present invention.

Similarly, it is possible to include the operation of the sphere 2 on board a drone type vehicle 3, a possible embodiment which is shown in FIG. 2.

In this case the drone 3 has two feet 31 in contact with the ground B.

As with the variant of FIGS. 1a-1b, in the drone 3 the sphere 2 can be used not only to correct the trajectory, but to move the drone 3 along the ground B.

To facilitate the movement, the feet 31 can have bearings capable of rotating on the ground B during the movement of the drone 3.

Finally, according to a further embodiment, it is possible to include that the feet 31 of the drone 3 have one or more magnetic elements adapted to cooperate with corresponding magnetic materials present on the ground B.

The presence of magnets facilitates the landing operations of the drone 3.

Drones do not have shock absorbers on their feet, so during landing they tend to bounce off the ground, but magnets confer a vertical constraint to the drones, which limits such bounces.

Obviously, the magnetic force creates an impediment both to take-off and during the movement of the drones along the ground B.

For this reason, the sphere 2 can advantageously, through the control unit 23, exert a force towards the ground B which helps to detach the drone 3 from the ground and facilitates the movement and take-off thereof.

While the invention is susceptible to various modifications and alternative constructions, some preferred embodiments have been shown in the drawings and described in detail.

It should be understood, however, that there is no intention of limiting the invention to the specific illustrated embodiment but, on the contrary, it aims to cover all the modifications, alternative constructions, and equivalents falling within the scope of the invention as defined in the claims.

The use of "for example", "etc.", "or" refers to non-exclusive non-limiting alternatives, unless otherwise stated.

The use of "includes" means "includes but not limited to", unless otherwise stated.

The invention claimed is:

1. A device for maintaining a trajectory of a vehicle, the vehicle moving along the trajectory and having at least one contact point with a ground, said device comprising:
   a sphere configured to rotate on the ground during a movement of said vehicle, wherein the sphere is housed inside a perforated housing seat obtained in the vehicle, which allows the sphere to remain in position, wherein a bottom wall of the perforated housing seat, which allows the outer surface of the sphere to be in contact with the ground;
   a control unit configured to activate said sphere, said sphere passing from an approaching condition with the ground, in which said sphere is in contact with the ground, to a distancing condition with the ground, in which said sphere is spaced with respect to the ground,
   rotation elements of said sphere, said rotation elements being controlled by the control unit and configured to rotate said sphere, wherein the control unit includes a sensor to detect a loss of friction by wheels and sudden change in travel parameters, wherein the parameters includes acceleration/deceleration of the vehicle, amount of motion and deviations between the planned trajectory and the actual trajectory, steering angle and automobile orientation, wherein based on the parameters, the control unit activates the rotation of the sphere so as to allow the vehicle to travel, curve correctly and avoid minimal drifting;
   wherein the sphere is configured to participate actively and provide a rotation in a specific direction to avoid drifting, or passively, providing the vehicle with an extra contact point with the ground;
   wherein the control unit is configured to adjust the ground approaching condition, so that the sphere is in contact with the ground exerting different pressures and contributing differently to increase in friction of the vehicle.

2. The device according to claim 1, wherein said rotation elements comprise at least two rollers having rotation axes perpendicular to each other, outer surfaces of said rollers being in contact with an outer surface of said sphere, so that rotation of one or the other roller drags the sphere by friction.

3. The device according to claim 2, wherein said control unit is configured for adjusting a rotation of said at least two rollers.

4. The device according to claim 1, wherein said control unit is configured for sensing an amount of motion of said vehicle.

5. A vehicle comprising:
   a movement system configured to cause a movement of said vehicle along a trajectory, said vehicle having at least one contact point with a ground,
   wherein said movement system comprises a device according to claim 1.

6. The vehicle according to claim 5, wherein said vehicle is a drone having at least two feet in contact with the ground.

7. The vehicle according to claim 6, wherein said movement system comprises at least one bearing or one wheel for each foot.

8. The vehicle according to claim 5, wherein said vehicle is a transport vehicle having wheels at the-contact points with the ground.

\* \* \* \* \*